June 9, 1953 K. W. SWEETON 2,641,060
EARTH INDUCTOR COMPASS ASSEMBLY
Filed Sept. 4, 1951
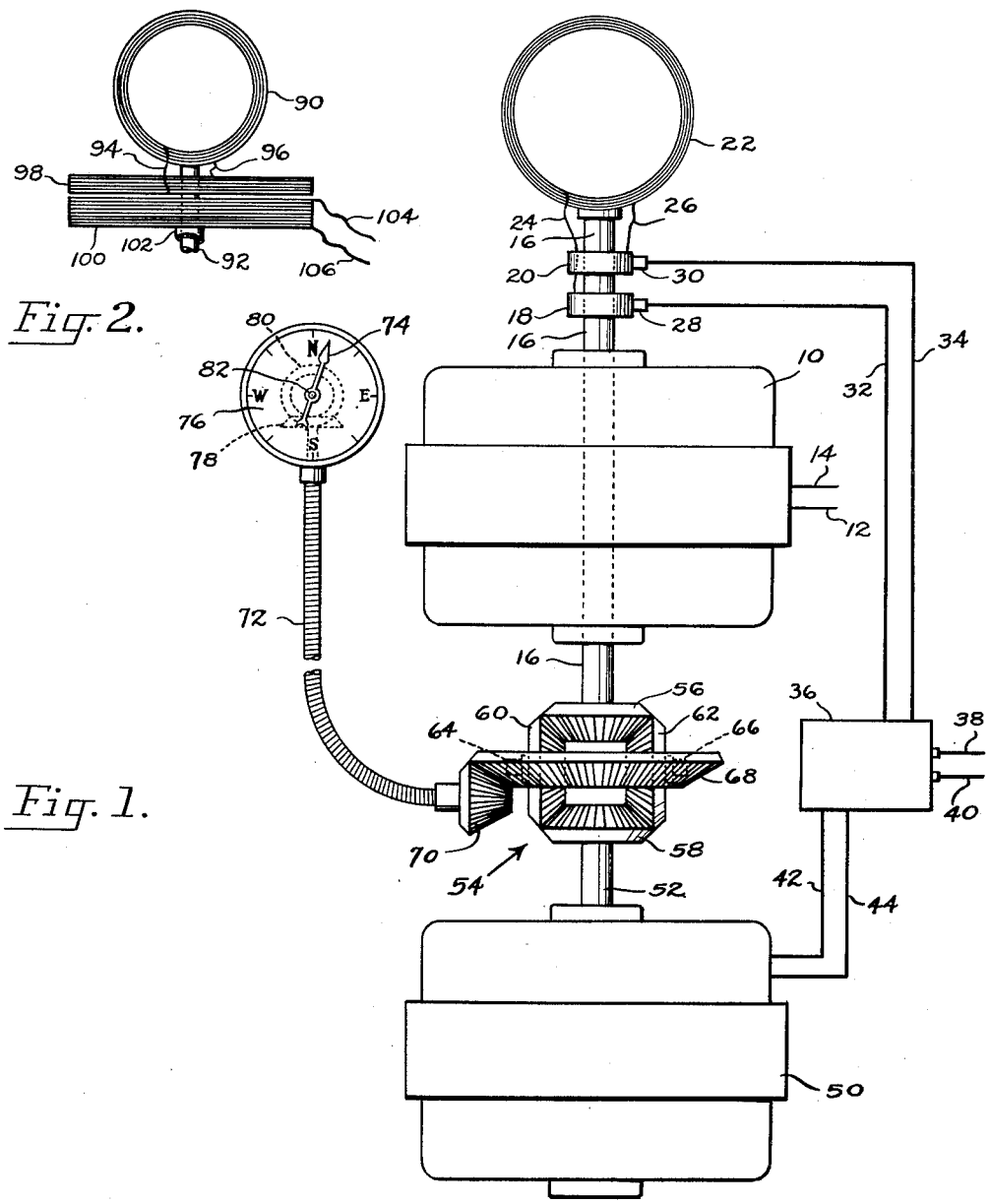
INVENTOR.
Kenneth W. Sweeton
BY Eugene D. Farley
Atty.

Patented June 9, 1953

2,641,060

UNITED STATES PATENT OFFICE 2,641,060

EARTH INDUCTOR COMPASS ASSEMBLY

Kenneth W. Sweeton, Portland, Oreg.

Application September 4, 1951, Serial No. 245,002

4 Claims. (Cl. 33—204)

The present invention relates to an earth inductor compass of the class which measures the amount of rotation of a given body about a given axis in a magnetic field and which is useful for indicating direction in marine and aerial navigation, in making maps, and in similar applications.

In the art of cartography, there may be carried by a truck or other moving vehicle an odograph comprising a magnetic needle indicating direction and linked photo-electrically to a plotting unit which plots the course of the vehicle using, for example, the rear wheels of the same for obtaining the distance traversed by the vehicle. Also, it is conventional practice in marine and aerial navigation to direct the course of a moving ship by employing a compass for indicating the deviation of the ship from a given course.

The prior art compasses used for the foregoing and similar purposes are unsatisfactory, however, in several respects. In the first place, the use of magnetic needles, gyro compasses or compasses which require the use of floating elements is precluded in applications such as the operation of automatic pilots in light or fast planes or boats where the erratic action of the vehicle interferes with the operation of the compass. In the second place, the compasses used conventionally in odographs require complicated photo-electric linkages for connecting them to the plotting unit, such linkages being costly and requiring frequent servicing when in use. In the third place, the conventional compasses or direction finders used in automatic pilots and similar applications do not per se produce sufficient torque to permit them to drive directly the apparatus associated with the automatic pilots, thereby necessitating the use of complicated auxiliary power amplifying and linking apparatus. Also, many of the prior art devices are unsatisfactory because of inertia effects and the disturbing influence of local bodies of magnetic material such as nickel, iron and cobalt.

It therefore is a primary object of the present invention to provide an earth inductor compass which is highly accurate but which is of simple, inexpensive construction.

It is another object of the present invention to provide an earth inductor compass which produces a substantial torque and may be connected by direct mechanical linkages to plotting units, automatic pilots and other apparatus which it is used to operate.

It is another object of the present invention to provide an earth inductor compass, the accuracy and stability of which are substantially unaffected by inertia, jolting, rapid change of course, the presence of local bodies of magnetic material such as nickel, iron and cobalt, and similar influences.

It is another object of the present invention to provide an earth inductor compass which is readily adaptable to numerous uses, for example, in the operation of odographs, the navigation of ships and planes, the operation of automatic pilots, and the like.

It is another object of the present invention to provide an earth inductor compass which may be connected to a driven mechanism by simple mechanical connections without the use of complicated electrical circuits, for example, circuits requiring the use of a reference signal, as described in Phair, U. S. 2,464,057.

It is another object of the present invention to provide an earth inductor compass which does not get out of adjustment under severe service conditions.

It is another object of the present invention to provide an earth inductor compass which does not require sensitivity to a slight change in voltage, or peaking of the current.

It is another object of the present invention to provide an earth inductor compass which makes maximum use of the sine curve produced by rotating earth inductor generators.

The manner in which the foregoing and other objects of this invention are accomplished will be apparent from the following specification and claims considered together with the drawings wherein:

Figure 1 is a schematic view in elevation of the presently described earth inductor compass assembly; and Figure 2 is a view in elevation of an alternate current collecting means which may be employed in the earth inductor compass assembly of Figure 1.

Generally stated, the earth inductor compass assembly of my invention comprises a drive motor having connected thereto an inductor rotor adapted to generate alternating current when rotated by the motor in the earth's magnetic field. A synchronous electric motor also is provided and placed in an electric circuit with the inductor rotor. It is driven at a rate proportional to the frequency of the electric current generated by the rotor.

Also included in the assembly is a differential gear assembly, one of the gears of which is connected to the drive motor and another of the gears of which is connected to the synchronous motor, the arrangement being such that the two gear members rotate at equal rates when the speed of the synchronous motor is determined solely by the speed of the drive motor. However, the two gear members will turn at different rates when the speed of the synchronous motor is determined in part by the rotation in the earth's magnetic field of the compass assembly including the inductor rotor. Since the differential rate of rotation of the gears will be proportional to the degree of rotation of the compass assembly, suitable indicating means may be connected to the differential gear for indicating directly the degree of rotation of the compass assembly.

Considering the foregoing in greater detail and with particular reference to the drawings:

The presently described earth inductor compass is adapted to be mounted on a truck, plane, ship or other moving vehicle, preferably in a vertical position. It includes a suitable drive motor which may be a pneumatic motor or, as illustrated in the drawings, an electric motor 10, connected through conductors 12, 14 to a source of electric current. Although various types of electric motors may be used, a suitable type for use in odograph compasses comprises a six volt, 1/10 hp., direct current motor operating at approximately 3600 R. P. M. on full load.

Drive motor 10 includes the rotatable shaft or armature 16 which extends entirely through the motor. Attached to the outer end of shaft 16 are current collecting means which in the illustrated embodiment comprise slip rings 18, 20. These are made of suitable electric conducting material and are of conventional construction.

Also carried by the outer portion of shaft 16 is the inductor rotor 22 which is attached to the end of the shaft and adapted to rotate with the same. It comprises a coil of electrically conducting wire having leads 24, 26 connecting coil 22 with slip rings 18 and 20.

As the inductor rotor 22 driven by motor 10 rotates in the earth's magnetic field it generates an alternating current which is transmitted to the slip rings. It is collected therefrom by means of the carbon brushes 28, 30 and transmitted by conductors 32, 34 to a suitable alternating current amplifier indicated generally at 36, and supplied with current from an outside source via conductors 38, 40.

The amplified current having a frequency the same as that generated by the conductor rotor is conducted via conductors 42, 44 to a synchronous electric motor 50, having the rotating shaft or armature 52. When the compass is to be used in an odograph, motor 50 may be, for example, a 120 volt, two pole, sixty cycle synchronous motor designed to lock in one position only with respect to the phase of the output of amplifier 36.

Also included in the presently described earth inductor compass is a differential gear assembly indicated generally at 54. Although it may be variously constructed, in the illustrated embodiment it comprises a ring gear encircling a closed system of interengaged bevel gears. Thus bevel gear 56 of the differential gear assembly is rigidly attached to the inner end of shaft 16 of drive motor 10 and is rotatable turn for turn with the inductor rotor 22 affixed to the outer end of the shaft.

Similarly bevel gear 58 is rigidly attached to shaft 52 of synchronous motor 50 and is rotatable turn for turn with shaft 52. Bevel gears 56 and 58 are interconnected through spider gears 60, 62. These in turn are rotatably mounted on shafts 64, 66, respectively, journalled within the encircling ring gear 68.

As is customary in mechanical differential gear assemblies of this class, the ring gear 68 is rotatable about the closed gear train which it encloses. It preferably is a bevel gear and is used to drive an indicator needle. To this end it engages a bevel gear 70 which in turn is connected to the flexible shaft 72. The latter shaft is connected to an indicating needle 74 registering on a compass dial face 76, the rotary motion of the flexible shaft being transmitted to the needle by a suitable linkage comprising, for example, gear 78 attached to the end of shaft 72 and engaging gear 80 attached to a shaft 82 upon which is mounted needle 74.

Illustrated in Figure 2 are alternate current collecting means which may be employed in place of the slip rings 18, 20 and carbon brushes 28, 30 of the embodiment of Figure 1. As is well known, slip rings in operation are characterized by a tendency to wear, to become scratched and to collect dirt. These factors result in a non-uniform output of current by the slip rings which in turn would be reflected in the operation of needle 74 of the compass assembly.

This disadvantage may be overcome by employing current collecting means having the construction of Figure 2. In accordance with that embodiment there is provided an inductor rotor 90 which is similar to inductor rotor 22 of Figure 1 and like the latter is attached rigidly to a shaft 92 driven by a motor not illustrated, but analogous to drive motor 10 of Figure 1.

The lead wires 94, 96 of inductor rotor 90 are connected to a coil of electrically conducting wire 98 which is rigidly attached to shaft 92 and adapted to rotate with the same and with inductor rotor 90. However, the turns of coil 98 lie in a plane which is substantially concentric with and perpendicular to the axis of rotation of shaft 92. Therefore, if rotor 90 is rotated in such a manner as to cut across the lines of force in a magnetic field such as the earth's magnetic field, coil 98 will revolve in its own plane and will not cut across the lines of force, save for an inconsequential effect caused by the fact that the windings of coil 98 are disposed in a form which is both a spiral and a helix. For the present purpose, however, this effect on the generation of current by rotation of coil 98 is substantially negligible.

Adjacent coil 98 and disposed in a plane parallel thereto is a second coil 100. This coil is stationary and therefore is mounted on the shaft 102 which is co-axial with shaft 92 but which does not rotate with the same. Coil 100 has leading therefrom the electrical conductors 104, 106 which correspond in the present application to conductors 32, 34 transferring current from the inductor rotor to the amplifier 36. Coils 98 and 100 may, if desired, be enclosed in iron shells or shells of proper magnetic permeability and shape to insure an optimum efficiency in operation.

As inductor rotor 90 revolves in the earth's magnetic field it will generate an alternating electric current which is transmitted through conductors 94, 96 to coil 98 which revolves turn for turn with rotor 90. This will produce a fluctuating field about coil 98, which, in turn, will result in the induction in coil 100 of a current of the same frequency which then may be transmitted via conductors 104, 106 to the amplifier or to any desired electric circuit.

It therefore is evident that the current collecting means illustrated in Figure 2 comprise what may be termed a dynamic transformer which may be used generally for taking off current from a rotating member and transmitting it to an electric circuit or, vice versa for transmitting current from a stationary to a rotating member.

The operation of the earth inductor compass of my invention is as follows:

When the compass assembly is mounted in a vertical position on a vehicle such as a truck, drive motor 10 will rotate the inductor motor 22 thereby generating an alternating current, the frequency of which is determined by the speed of the rotor. This current is collected by means of slip rings 18, 20 or by means of the coplanar coils 98, 100, and transmitted to the amplifier 36.

The amplified current then is transmitted to the synchronous electric motor 50 which will be driven turn for turn with rotor 22. Since the shaft 16 of drive motor 10 is connected to gear 56, and shaft 52 of the synchronous motor 50 is attached to gear 58 of the differential, the two gears will be driven at equal rates, and the effect of the two motors on the differential gear assembly 54 will be cancelled.

However, if the entire compass assembly be rotated through an angle of 360°, as where the truck on which it is mounted makes a complete turn, then the inductor rotor will generate either one more or one less cycle of current depending upon in which direction the truck turns. This loss or gain of one cycle will be reflected in a corresponding loss or gain of one revolution of the synchronous motor 50 and hence gears 56 and 58 of the differential will revolve at a differential rate.

The difference in rate of revolution of gears 56 and 80 will be communicated to the encircling ring gear 68 which will rotate through 180° if there is a complete loss or gain of one revolution of either of gears 56 or 58. This then may be transmitted through gears of suitable ratio to the needle 74 of the compass, which therefore indicates the deviation of the vehicle from its predetermined course.

It will be further evident that both the drive motor and the synchronous motor feed substantial and positive forces into the differential gear. As a result, the flexible shaft 72 driven thereby exerts a substantial torque which may be used directly for driving plotting machinery, automatic pilots and similar instruments. This eliminates the complicated photoelectric apparatus conventionally used for these purposes and leads to the provision of apparatus which is sensitive and accurate in operation.

It is to be understood that the forms of my invention herewith shown and described, are to be taken as preferred examples of the same, and that various changes in the shape, size and arrangement of parts may be resorted to, without departing from the spirit of my invention or the scope of the subjoined claims.

Having thus described my invention, I claim:

1. An earth inductor compass assembly comprising a drive motor, an inductor rotor connected to the drive motor and adapted to generate alternating current when rotated by the drive motor in the earth's magnetic field, a synchronous electric motor in an electric circuit with the inductor rotor and driven at a rate proportional to the frequency of the current generated by the rotor, a differential gear assembly one of the gear members of which is connected to the drive motor and another of the gear members of which is connected to the synchronous motor, the two said gear members rotating at uniform rates when the speed of the synchronous motor is determined solely by the speed of the drive motor, but at a differential rate when the speed of the synchronous motor is determined in part by the rotation in the earth's magnetic field of the compass assembly including the inductor rotor, the differential rate being proportional to the degree of such rotation of the compass assembly, and indicating means connected to the differential gear assembly for indicating the degree of rotation of the compass assembly.

2. An earth inductor compass assembly comprising a drive motor, an inductor rotor connected to the drive motor and adapted to generate alternating current when rotated by the drive motor in the earth's magnetic field, current collecting means contacting the inductor rotor for collecting the current generated by the same, a synchronous electric motor in an electric circuit with the current collecting means and driven at a rate proportional to the frequency of the current generated by the rotor, a differential gear assembly one gear member of which is connected to the drive motor and another gear member of which is connected to the synchronous motor, the two gears rotating at equal rates when the speed of the synchronous motor is determined solely by the speed of the drive motor, but at a differential rate when the speed of the synchronous motor is determined in part by the rotation of the compass assembly in the earth's magnetic field, the differential rate being proportional to the degree of such rotation of the compass assembly, and a compass dial connected to the differential gear assembly for indicating the degree of such compass assembly rotation.

3. The earth inductor compass assembly of claim 2 wherein the differential gear assembly comprises a ring gear encircling a closed system of four inter-engaged bevel gears, two opposite ones of which have shafts extending therefrom connected respectively to the drive motor and the synchronous motor, the remaining two of which are rotatably mounted in the interior of the ring gear, and the ring gear of which is connected to the compass dial.

4. The earth inductor compass assembly of claim 2 wherein the current collecting means comprises a first coil of electrically conducting wire connected to and rotatable with the inductor rotor but rotatable in its own plane, and a second coil of electrically conducting wire parallel to and adjacent the first coil and in current inducing relationship thereto, the second coil being in an electric circuit with the synchronous motor.

KENNETH W. SWEETON.

References Cited in the file of this patent

UNITED STATES PATENTS

| Number | Name | Date |
|---|---|---|
| 2,464,057 | Phair | Mar. 8, 1949 |

FOREIGN PATENTS

| Number | Country | Date |
|---|---|---|
| 318,206 | Germany | Jan. 15, 1920 |
| 539,817 | Great Britain | Sept. 25, 1941 |